Patented Feb. 12, 1935

1,991,048

UNITED STATES PATENT OFFICE 1,991,048

PROCESS FOR PRODUCING AN OLEAGINOUS COLOR MATRIX

Otto Bratke, Berlin, Germany

No Drawing. Application November 23, 1931, Serial No. 576,957. In Germany November 24, 1930

5 Claims. (Cl. 134—1)

Instead of varnish oleaginous color matrices are employed, which consist of small quantities of linseed oil soap, glue and of large quantities of varnish, resin solution and water. These color matrices, which differ from pure varnish by their cheapness owing to the high water addition, produce a relatively weather proof coating. If the coating produced with the color matrix is to be particularly durable, the above-mentioned substitute for pure varnish is not satisfactory because the color matrix contains a high percentage of substances which are liable to cause saponification.

The process forming the subject matter of the application offers the possibility of producing a color matrix containing only such slight traces of substances which might cause saponification with oil, that they are absolutely immaterial. In this process an emulgator is employed which consists of a product of distillation obtained during the fractionized distillation of beechwood tar at temperatures between 250 and 300° C. or products of distillation equivalent thereto with a slight addition of an alkali. These equivalent products are chiefly benzoic acid, salicylate of sodium, o-m-p cresol, xylinol, guaiacol, creosol and the like. Slight traces of this emulgator are added to the pure heated oil, which is being energetically stirred the while, and at the same time a suitable quantity of warm water is admixed with the warm oil. After a short time all the substances enter into intimate combination and if the finished color matrix is then cooled, there is no longer any possibility of further diluting same by the addition of further quantities of water. In the selection of the hydrocarbon and of the alkali one is not bound to narrow limits, and the proportion between water and oil may vary very considerably according to the quality required for the finished color matrix. It has been found particularly advantageous to proceed in the following manner when carrying out the process:—

Distill 3 kgs. of beech-wood tar at about 250° C. to 350° C., collect the distillate and leave the same several days to cool and to separate out the different products of distillation. Then pour off the clear liquid from the sediment and intimately mix 1 kg. of caustic soda liquor having a strength of 43° Bé. to 15 grams of this product of distillation. This mass represents the emulgator. The quantity of emulgator necessary for finishing the matrix depends upon the quality of the linseed oil or varnish to be worked. It varies for 1 kg. of varnish between 0.25 and 0.75 gms. of emulgator. In order to be able to easily mix the emulgator with the oil, it is advisable to dilute with about 50 gms. of water the quantity of emulgator determined by testing. Thus for example 1 kg. of linseed oil is heated to 25 to 30° C. and the oil poured into a mechanical, rapidly rotating stirring mechanism, whereupon for example 0.25 gms. of the emulgator diluted with 50 gms. of water is added to the oil in a thin jet, and at the same time warm water is poured into the stirring vat, the quantity of water preferably amounting to 30 to 50% of that of the varnish according to the quality of the product required. After a few minutes all the substances mentioned will be so intimately intermixed, that the stirring process can be stopped. The finished color matrix absorbs after cooling no longer any water, but in use behaves exactly like pure linseed oil or varnish.

Although it is advisable, to not increase the quantity of water to more than 50% of that of the varnish, it is nevertheless possible to obtain an absolutely homogenous color matrix even if the quantity of water exceeds 100% of the quantity of varnish. It is then even still possible to produce a coating having a great covering property and drying with a high polish.

I claim:

1. A process for producing an oleaginous color matrix, consisting in forming an emulgator from a product of distillation obtained during the fractionized distillation of beechwood tar at temperatures between 250 and 300° C. with an addition of an alkali, in adding minute quantities of said emulgator to large quantities of heated linseed oil, in stirring continually, and at the same time pouring 30 to 100% of warm water into the stirring vat.

2. A process for producing an oleaginous color matrix consisting in forming an emulgator from a product of distillation obtained during the fractionized distillation of beechwood tar at temperatures between 250 and 300° C. with an addition of an alkali, in adding minute quantities of said emulgator to large quantities of heated varnish, in stirring continually, and at the same time pouring 30 to 100% of warm water into the stirring vat.

3. A process as specified in claim 1, consisting in obtaining a clear distillate from beechwood tar at 250 to 350° C., in mixing 15 gms. of this distillate with 1 kg. of caustic soda liquor of 43° Bé. to form an emulgator, in adding 0.25 to 0.75 gms. of this emulgator to 1 kg. of linseed oil energetically stirring the while, and at the same time adding warm water in a quantity of preferably 30 to 50% of the quantity of the linseed oil.

4. A process as specified in claim 1, consisting in obtaining a clear distillate from beechwood tar at 250 to 350° C., in mixing 15 gms. of this distillate with 1 kg. of caustic soda liquor of 43° Bé. to form an emulgator, in adding 0.25 to 0.75 gms. of this emulgator to 1 kg. of varnish energetically stirring the while, and at the same time adding warm water in a quantity of preferably 30 to 50% of the quantity of the varnish.

5. A process for producing an oleaginous color matrix consisting in forming an emulgator from an equivalent to a product of distillation obtained during the fractionized distillation of beechwood tar at temperatures between 250 and 300° C. with an addition of an alkali, in adding minute quantities of said emulgator to large quantities of heated linseed oil, in stirring continually, and at the same time pouring 30 to 100% of warm water into the stirring vat.

OTTO BRATKE.